Patented Nov. 15, 1932

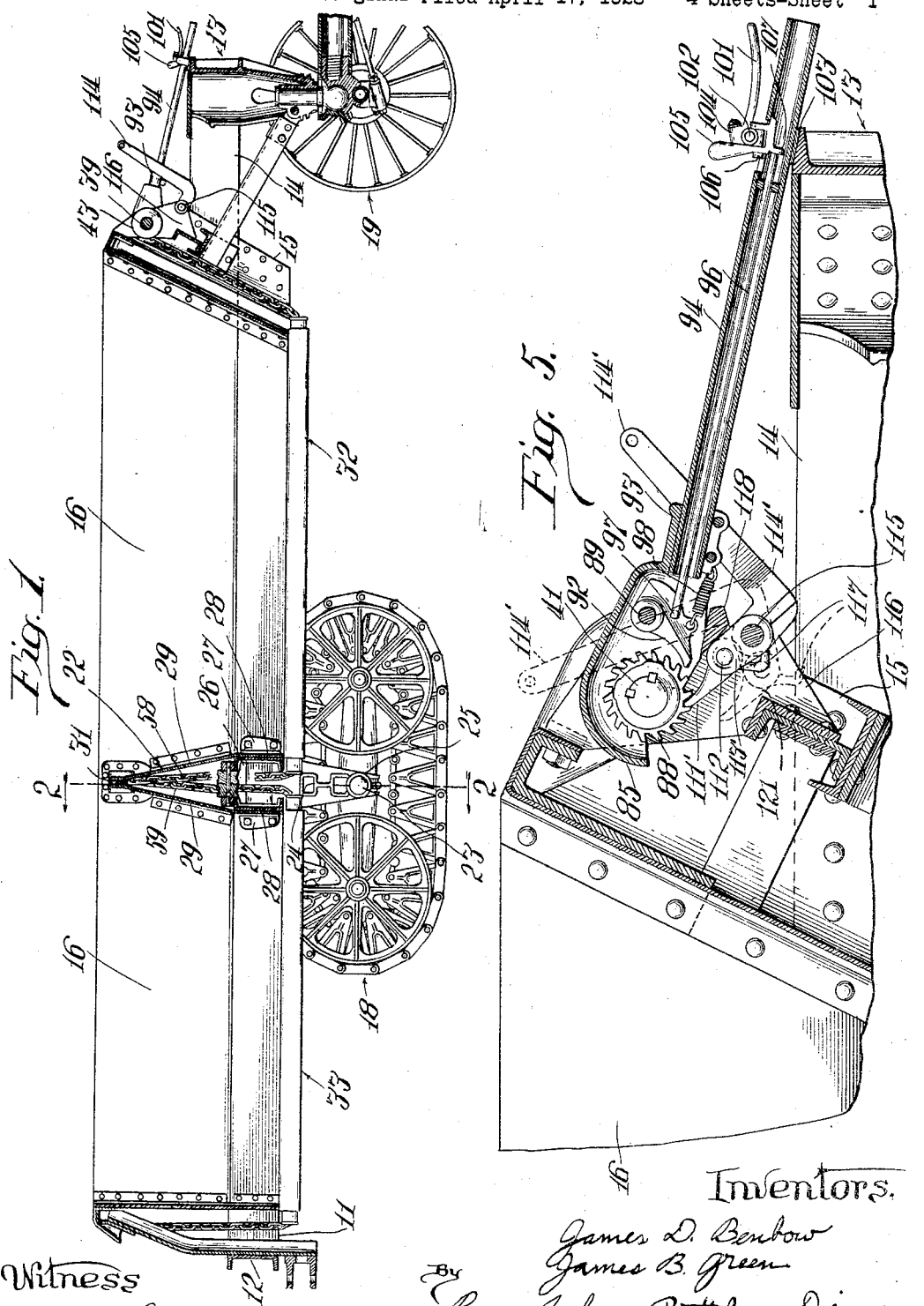

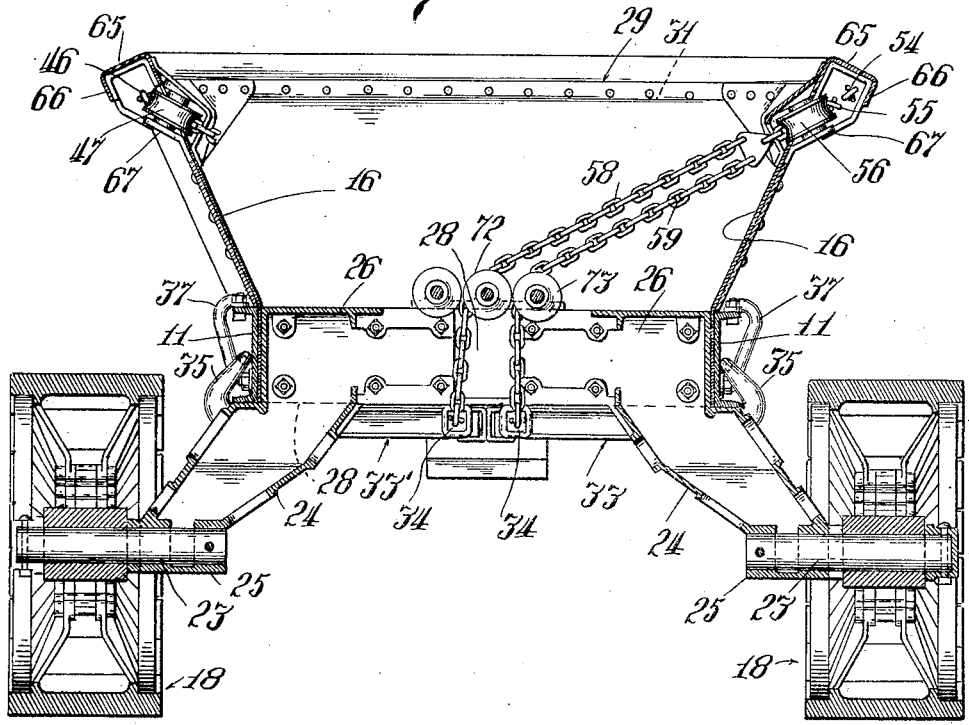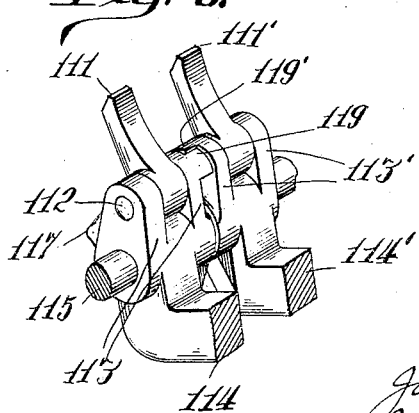

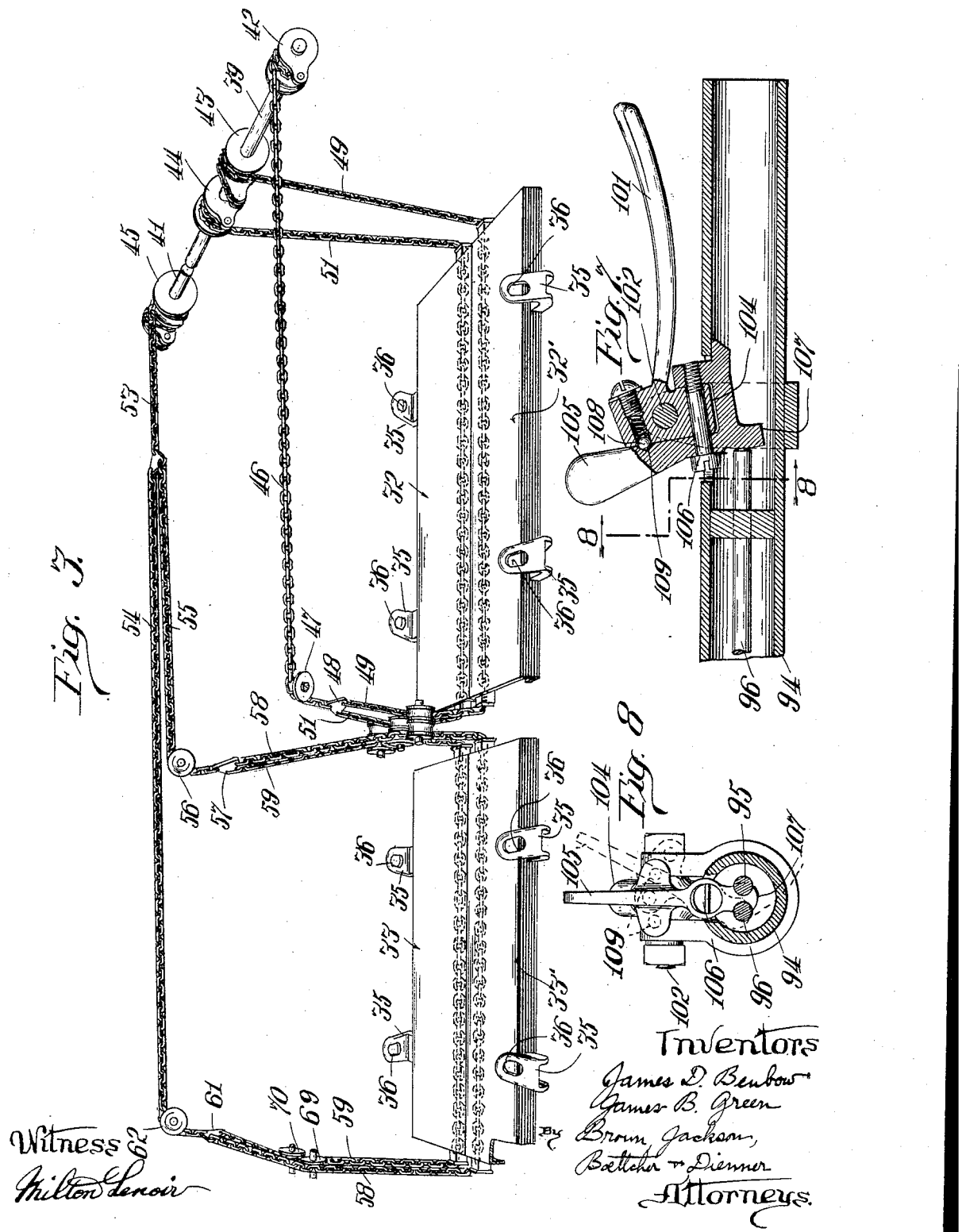

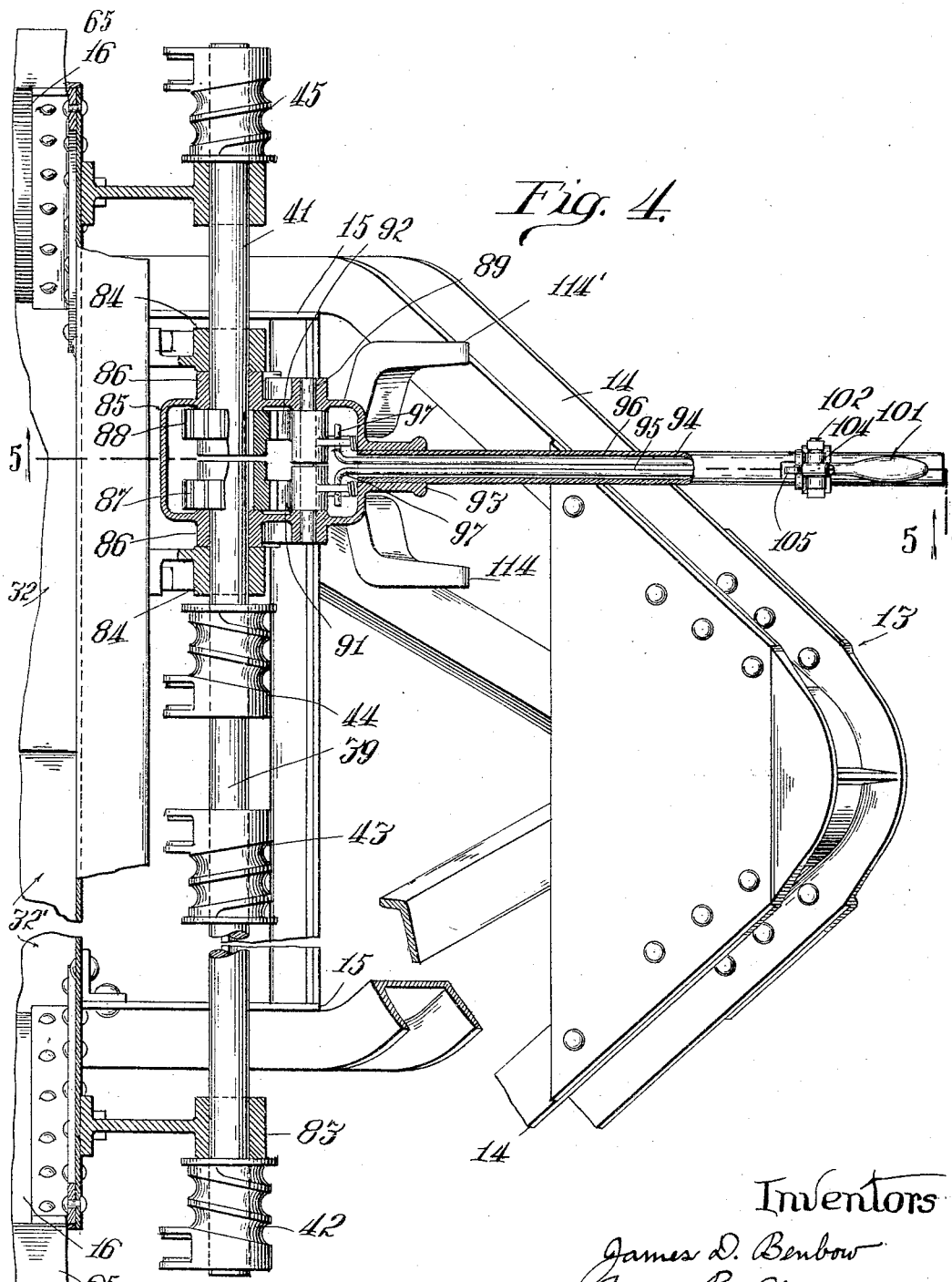

1,887,914

UNITED STATES PATENT OFFICE

JAMES D. BENBOW AND JAMES B. GREEN, OF AURORA, ILLINOIS, ASSIGNORS TO WESTERN WHEELED SCRAPER COMPANY, OF AURORA, ILLINOIS, A CORPORATION OF ILLINOIS

DUMP WAGON

Original application filed April 17, 1928, Serial No. 270,645. Divided and this application filed January 5, 1929. Serial No. 330,556.

The present invention relates to dump wagons, and is divisional of our co-pending application Serial No. 270,645, filed April 17, 1928. In such application we disclosed a dump wagon embodying, among other features, an improved arrangement of dump doors and an improved form of winding mechanism for operating the doors. The present application is directed to this winding mechanism and to the manner in which the same is operatively connected with the doors. The wagon is supported on endless self-laying tracks or treads disposed at opposite sides of the wagon and mounted on an arched axle structure extending transversely of the load carrying bed intermediate the ends thereof. Such construction, in relatively long wagons, makes it desirable to employ two pairs of dumping doors, one pair disposed forwardly of the arched axle structure and the other pair rearwardly thereof.

One of the principal objects of the present invention is to provide an improved construction of winding mechanism capable of operation for raising all of the doors simultaneously, or for raising different doors selectively.

Another object of the invention is to provide improved tripping means associated with the winding mechanism and arranged whereby the rear pair of doors can be dropped independently of the front pair of doors, but the front pair of doors cannot be dropped independently of the rear pair of doors. Such construction prevents the possibility of a load condition arising which might tilt the wagon backwardly around the intermediate pivot axis of the endless tread units.

Another object of the invention is to provide an improved arrangement of the chains or other flexible members operatively connecting the winding mechanism with the doors.

Other objects and advantages of the invention will appear in the following description of a preferred embodiment thereof. In the accompanying drawings illustrating such embodiment:—

Fig. 1 is a longitudinal sectional view through the improved wagon;

Fig. 2 is a transverse sectional view thereof, taken approximately on the plane of the line 2—2 of Fig. 1;

Fig. 3 is a diagrammatic perspective view illustrating the paths of the chains extending from the winding mechanism to the several dump doors;

Fig. 4 is a plan view, partly in section, showing the construction of the winding mechanism Fig. 5 is a sectional view transversely through the winding mechanism, taken approximately on the plane of the line 5—5 of Fig. 4;

Fig. 6 is a fragmentary perspective view of the two tripping pawls of the winding mechanism;

Fig. 7 is an enlarged longitudinal sectional view through the front end of the winding handle; and Fig. 8 is a transverse sectional view taken on the plane of the line 8—8 of Fig. 7.

The frame of the wagon comprises two longitudinal beams 11, constituting the side sills of the wagon bed, such beams preferably being of channel section. The rear ends thereof are joined by a transverse channel beam 12 which is suitably secured to the longitudinal beams 11 by gusset plates riveted to the adjoining ends of the three beams.

The front ends of the side beams 11 are secured to an elevated frame extension 13 comprising two channel bars 14 projecting forwardly from and above the ends of the side beams 11. Plates 15 extend upwardly along the inner sides of the overlapping ends of the channels 11 and 14, and are riveted to both channels for joining the same together. The bed of the wagon is of hopper shape having sloping side walls, and comprises plates 16 which are suitably secured to the frame structure, as best shown in Fig. 2. The self-laying track or endless tread units are indicated at 18, it being noted that these units are disposed approximately midway between the ends of the load carrying bed so that the treads carry practically all of the load.

In most instances, the front end of the wagon will be supported on a wheeled truck 19, although the construction is such that this wheeled truck can be easily removed so that the front end of the wagon may be mounted directly on the tractor or other pulling vehicle.

Intermediate the ends of the bed is a transverse partition or dividing wall 22 (Fig. 1) which separates the interior of the bed into front and rear compartments. The structure which supports the two endless tread units 18 is built into this transverse partition. The rocker beam of each tread unit is pivotally supported on a stub axle 23 which is mounted in an axle bracket 24 joined to the frame within the transverse partition 22.

Referring to Fig. 2, it will be observed that the bracket 24 comprises an outwardly and downwardly inclined arm, which is preferably hollow and suitably reenforced, and which carries a hub 25 at its lower end in which the stub shaft or axle 23 is mounted. The upper end of each bracket 24 is formed with a horizontally extending box-like portion 26 having at its outer end laterally projecting attaching flanges 27 (Fig. 1) which are bolted or riveted to the inner side of the adjacent frame channel 11. As shown in said latter figure, two channel bars 28 extend transversely from side to side of the frame and have their flanges facing inwardly towards each other for embracing the upper and lower sides of the box-like portions 26 of both brackets. The channel bars 28 are bolted to the latter portions of the brackets, thereby providing, in effect, a heavy strut extending between the brackets and sustaining the sagging or spreading stresses set up between the two axle brackets. As shown in Fig. 2, the inner ends of the two box-like portions 26 are separated to provide a passageway down between the two channel bars 28, 28, through which passageway certain of the hoisting chains can pass to the dumping doors, as will be presently described. Referring to Fig. 1, plates 29 are secured to the outer sides of the channel bars 28 and extend upwardly approximately to the top of the body, where they are converged together and secured to the opposite sides of a bar 31 extending transversely between the side walls 16, 16. These plates complete the tapering upper portion of the transverse partition or dividing wall 22.

The bottom of the compartment defined in front of the partition 22 is closed by two doors 32, 32'; and the bottom of the compartment defined in rear of the partition 22 is closed by two similar doors 33, 33'. One preferred manner of constructing these doors has been described at length in our copending application. For the purposes of the present description, it will suffice to say that these doors may be constructed of metallic plates secured over the upper side of a reenforced frame structure and having their lateral edges bent around the lateral edges of the frame structure. Each door is so constructed that a longitudinal passageway 34 (Fig. 2) is formed therein adjacent to its inner edge, such passageway extending entirely from end to end of the door and receiving the hoisting chain associated with that particular door. The outer edges of all of the doors are hinged to the side channels 11 of the wagon frame, by the provision of hinge brackets 35 (Fig. 3) projecting from the outer edges of the doors and having elongated openings 36 therein which engage over brackets 37 (Fig. 2) secured to the side channels 11. Such hinge mounting of the doors permits the hinge movement of the doors down into their dumping position, and also permits the doors to shift upwardly and downwardly, when in their dumped position, so that they can clear themselves from the dumped pile and other obstructions as the wagon is being drawn away after dumping.

The arrangement of the chains for raising the several doors will be best understood by reference to the diagrammatic illustration in Fig. 3.

The winding mechanism is located at the front end of the wagon and comprises two co-axial shafts 39 and 41. Mounted on the shaft 39 are three helically grooved winding drums 42, 43 and 44, and mounted on the other shaft 41 is a similar winding drum 45. Connected to and winding about the drum 42 is a chain 46 which extends along one side of the wagon and passes downwardly around a pulley 47 disposed intermediate the ends of the wagon. To the end of the chain 46 is connected an equalizing bar 48, to the ends of which, in turn, are connected two chains 49 and 51. The latter chains extend downwardly to the free, inner edges of the two doors 32, 32' and pass forwardly through the guide passageways 34 in their respective doors. Passing outwardly from the front edges of the doors, these chains extend upwardly to the two winding drums 43 and 44. It will be evident that in a winding rotation of the three drums 42, 43 and 44, the opposite ends of the two chains 49 and 51 will be drawn upwardly, thereby raising both doors 32 and 32' to closed position. The equalizing bar or link 48 compensates for any inequality in the lengths of the two chains and results in both doors being raised under equal forces.

Connected to and winding about the other drum 45 is a chain 53 which extends rearwardly along the other side of the wagon. This chain is linked to two chains 54 and 55, the first of which extends back to the rear end of the wagon and the second of which passes downwardly around a pulley 56 disposed intermediate the ends of the wagon.

The end of the latter chain is connected to an equalizing link or bar 57, the two arms of which are in turn connected to two chains 58 and 59. Such chains extend down to the front edges of the two rear doors 33, 33' and extend through the passageways 34 in said doors back to the rear edges thereof, where they extend upwardly to an equalizing bar 61. The chain 54, which extends back to the rear end of the vehicle, passes downwardly around a pulley 62 and is connected to the equalizing bar 61. It will be evident that winding rotation of the drum 45 will draw upwardly on the two chains 54, 55, thereby pulling upwardly on opposite ends of the two hoisting chains 58 and 59 and raising the doors 33, 33' to closed position. The interposition of the equalizing bars 57 and 61 between the ends of the latter chains and the ends of the pulling or winding chains 54, 55 result in equal lifting forces being transmitted to both doors.

Those portions of the chains extending back along the sides of the wagon are preferably housed over on the top to prevent the possibility of the chains being struck by the loading shovel or having material dropped thereon. In the construction shown in Fig. 2, the upper margins of the side plates 16 are bent outwardly to form the top flange 65 and are then bent downwardly to form the outer flange 66. These flanges reenforce the upper edges of the side plates 16 and also form protecting enclosures or channels in which are disposed the longitudinally extending portions of the chains.

A series of straps or bars 67 are preferably extended between the lower edges of the flanges 66 and the side walls of the bed at spaced points along the length of the bed, such straps or bars providing a plurality of supports and preventing the chains from dropping down out of the channel.

As best shown in Fig. 2, the two intermediate sheaves or pulleys 47 and 56 are disposed in openings cut in the side plates 16, being supported in suitable brackets disposed at an angle so as to direct the chains 46 and 55 inwardly and down into the hollow partition 22. The openings in the side plates 16, in which these pulleys are disposed, may be covered by suitable bulged plates to prevent the entrance of dirt down into the interior of the partition 22. Fig. 2 shows the two hoisting chains 58 and 59 extending downwardly between the side walls 29, 29 of such partition and passing down around two pulleys 72 and 73. The pivot axes of such pulleys are supported in brackets mounted on the upper edges of the transverse channels 28, 28, as shown in section in Fig. 1. The chains 58, 59 pass downwardly from these pulleys through the space intervening between the inner ends of the box-like bracket portion 26 and then extend rearwardly through the passageways 34 provided in the two rear doors 33, 33'. To avoid obscuring the illustration, the chains 49 and 51 for the front pair of doors have not been shown, but it will be understood that these two chains also pass down around pulleys, corresponding to the pulleys 72—73, but disposed slightly forwardly thereof, and extend down between the bracket portions 26 and thence forwardly through passageways 34 in the front pair of doors 32, 32'.

It will thus be seen that the hollow partition or dividing wall 22 serves the two-fold purpose of a transverse strut, reenforcing the intermediate portion of the wagon against sagging or spreading stresses in the transverse plane of the tread units 18, and also serves as a housing or enclosure through which the hoisting chains can be extended to the inner ends of both pairs of doors.

As previously described, the chain 54 extends to the rear end of the wagon and passes downwardly around a pulley 62. Such pulley is suitably supported in a bracket mounted at the rear corner of the bed within the channel guide 65—66. The rear ends of the two hoisting chains 58, 59, which connect to this chain 54, pass down around pulleys 69, 70 (Fig. 3) similar to the pulleys 72, 73, which are suitably supported at the rear end of the frame, the two hoisting chains thence passing forwardly through the rear dumping doors 33, 33' as previously described.

Referring now to Figs. 4, 5, 6, etc., it will be seen that the two winding shafts 39 and 41 have bearing support in two outer bearing brackets 83 which are suitably secured to the front wall of the bed. The proximate ends of said shafts also have bearing support in brackets 84, between which is disposed a housing 85, the shaft ends entering this housing through bearing bosses 86, the latter affording a rotatable support of the housing 85 on the shafts. Keyed to the ends of the respective shafts within the housing 85 are ratchet wheels 87 and 88.

The forwardly extending portion of the housing supports a transverse pivot shaft 89 on which two independently acting pawls 91 and 92 are mounted. The front portion of the housing 85 is formed with a split clamping extension 93 in which is secured a tubular operating lever or handle 94. Passing forwardly through such handle are two control rods 95 and 96 which have their rear ends bent laterally for effecting pivotal connection with lugs projecting from the pawls 91, 92, as indicated at 97. As shown in Fig. 5, a tension spring 98 is connected to the lower portion of each pawl, these springs normally tending to withdraw the two pawls from the teeth of their respective ratchet wheels 87 and 88. Rearward thrusting movement of the rods 95, 96 is effective to swing the pawls into the teeth of their ratchet wheels in opposition to the action of the springs 98. It will be evident that with the pawls thus engaged in the ratchet wheels, vertical oscillation of the operating handle 94 is effective to transmit winding rotation to the two shafts 39 and 41.

Both control rods may be thrust rearwardly in unison, or one control rod may be thus actuated independently of the other through the operation of selecting mechanism at the front end of the handle 94. Thrusting movement is imparted to the rods through a lever 101 which is adapted to be squeezed toward the handle 94 in the act of gripping the end of the handle. Said lever is rotatably supported on a pivot pin 102 which is supported in a bracket 103 encircling the handle 94, the lever 101 being supported between spaced pivot portions of said bracket.

The lever comprises a block 104 having a flat rear face on which is pivotally supported a selector member 105. Such member has transverse swinging movement across the face of the block about a pivot screw 106 extending through the member and into the block. The lower portion of the selector member 105 extends down into the tubular handle 94 and comprises a pallet-shaped portion 107 which is adapted to occupy any one of the different positions indicated in Fig. 8. In its intermediate position, such extension is effective to transmit movement to the ends of both control rods 95 and 96, and by moving the selector member to one side or the other such extension is placed in position to transmit movment to one of the rods without transmitting movement to the other. The selector member is yieldingly held in each of these three positions by a spring pressed ball 108, mounted in a recess in the block 104. Said ball has detent engagement in depressions formed in the face of a segment member 109 carried by the upper finger portion of the selector member. It will be apparent that, in squeezing the lever 101 toward the handle, the selector member will oscillate correspondingly and will transmit movement to either or both control rods 95, 96, depending upon the position in which the selector member is placed with reference to the lever 101. Hence, by appropriately placing the selector member in one position or the other, the winding mechanism is made effective to raise both pairs of doors simultaneously with the stroking of the handle 94, or to first raise one pair of doors, and by then shifting the selector member, to raise the other pair of doors.

The two ratchet wheels 87 and 88 are normally held against retrograde movement by two locking pawls 111, 111', engaging respectively in the teeth of their associated ratchet wheels, below the operating or advancing pawls 91, 92. The two locking pawls are mounted on pivots 112 and supported by the relatively short arms 113, 113' of two bell crank levers 114, 114'. Such bell crank levers are pivotally supported on a fixed shaft 115, extending between the side portions of a stationary bracket structure 116, which is disposed adjacent to the rotatable housing 85. Each of these locking or detent pawls has a stop projection 117 adapted to engage the under side of its associated lever 114, 114', for limiting rotation of the pawl in a counterclockwise direction about its pivot 112. The weight of the long outer arm of each tripping lever 114, 114', normally tends to hold said lever in the position indicated in full lines in Fig. 5, with the end of the short lever arm engaging a fixed stop 118, carried by the bracket structure 116. With each tripping lever in this position, the reactive thrust of the associated ratchet wheel against the detent pawl 111 or 111' acts along a line which serves to hold the lever arms 113 or 113' pressed against the stop 118, that is to say, the lever arm and each detent pawl have the relation of two toggle links tending to force the pivot 112 upwardly or forwardly. To release each detent pawl, it is only necessary to break this toggle in a downward direction, such being accomplished by swinging the long arm of the associated tripping lever 114, 114' in a rearward direction.

The tripping lever 114 is effective to drop the two front doors, through its release of the ratchet wheel 87 and winding shaft 39. The other tripping lever 114' is effective to drop the rear pair of doors, through its release of the other ratchet wheel and associated winding shaft 41. The latter tripping lever is actuatable at any time independently of the first mentioned lever for dropping the rear pair of doors. This will result in the dumping of the load in the rear compartment of the wagon without dumping the load in the front compartment, the weight of this latter portion of the load being forward of the transverse pivot axis of the endless tread units 18 and, hence, maintaining the stability of the wagon. Provision is made, however, for preventing the front pair of doors from being dropped independently of the rear pair of doors, as it will be evident that the dumping of the load in the front compartment, without dumping the load in the rear compartment, might result in this latter load tipping the front end of the wagon upwardly around the transverse pivot axis of the tread units. Referring to Fig. 6, it will be seen that the short arm of the lever 114 has a segment-shaped projection 119 on the inner side thereof, and the short arm of the other tripping lever 114' has a similarly shaped projection 119' on its inner side and in the path of the companion projection 119. The projection 119' is disposed in rear or below the projection 119, so that its tripping lever 114' can be rocked backwardly and downwardly for dumping the rear doors without compelling corresponding movement of the other tripping lever 114. When this latter lever is operated, however, for dumping the front pair of doors, the stop projection 119 engages the companion stop projection 119', thereby compelling concurrent movement of the other tripping lever 114' for releasing both pairs of doors. Thus, in any selective dumping operation, there is no possibility of dumping the load from the front portion of the bed without also dumping the load from the rear portion of the bed, and, hence, there is no possibility of a load condition being established which might tend to tilt the front end of the wagon upwardly around the transverse pivot axis of the endless tread units.

When either pair of doors is dropped, the corresponding detent pawl 111 or 111' swings down to the position indicated approximately in dotted lines in Fig. 5. When the pawl is restored to operative position, its proper engagement in the teeth of the associated ratchet wheel is assured by the engagement of the stop projection 117 with a shoulder 121 on the bracket structure 116, whereby the pawl is caused to swing outwardly around the pivot 112 to a position substantially in prolongation of the short lever arm 113 or 113'. As each ratchet wheel is advanced in a door lifting operation, the associated tripping lever 114, or 114', oscillates slightly on the pivot shaft 115 as its detent pawl drops behind successive teeth of the wheel, the projection 117 maintaining the lever and the pawl is substantially rigid relation during such oscillatory movement of the tripping lever.

As previously remarked, the weight of the long outer arm of the lever normally holds the detent pawl in the teeth of the ratchet wheel.

It will be seen from the foregoing that both pairs of doors can be operated together simultaneously, and in fact the mechanism positively compels both pairs of doors to drop simultaneously whenever the front pair of doors is tripped for dumping. Thus the mechanism can be operated so that both pairs of doors function in the same manner as a single pair of doors, i. e., the two longitudinally aligned doors along each side of the wagon then function as a single door extending entirely from end to end of the bed, with the intermediate space or notch between them serving to clear the adjacent axle bracket arm 24.

While we have described what we regard as the preferred embodiment of our invention, it will be understood that such is merely exemplary and that numerous modifications and changes may be made therein without departing from the invention.

We claim:—

1. The combination with a dump wagon comprising two dump doors, of mechanism for raising said doors to closed position comprising flexible hoisting members operatively connected with both doors, winding members on which said flexible hoisting members are wound, ratchet wheels individual to each of said winding members, advancing pawls associated with each of said ratchet wheels, a common operating handle for transmitting movement to both pawls, and means comprising a selector member carried by and actuatable from said handle for selectively engaging and disengaging said pawls and their associated ratchet wheels.

2. The combination with a dump wagon comprising dump doors, of mechanism for raising said doors to closed position comprising flexible hoisting members operatively connected with said doors, separate winding drums on which the hoisting members of said doors are wound, ratchet wheels operatively connected with each of said winding drums, a swinging support rotating concentrically of the axis of said ratchet wheels, individual advancing pawls for each of said ratchet wheels, mounted on said swinging support, means normally tending to hold said pawls out of operative engagement with their respective ratchet wheels, an operating handle extending from said swinging support, two control rods extending longitudinally of said operating handle and effective by thrusting movement to move said pawls into engagement with said ratchet wheels, a lever mounted on said handle member and operative to transmit thrusting movement to said rods, and a selector member associated with said lever for establishing operative connection between said lever and either or both of said rods whereby either or both of said pawls can be moved into operative engagement with their respective ratchet wheels.

3. The combination with a dump wagon comprising dump doors, of mechanism for closing said doors comprising a winding drum, a ratchet wheel connected therewith, means for rotating said ratchet wheel to raise said doors, and releasable detent mechanism for holding said ratchet wheel against retrograde movement, said detent mechanism comprising a lever having diverging arms of different lengths, the shorter one of said arms being pivotally mounted on a substantially stationary axis tending to cause said lever to pivot in a clockwise direction, a detent pawl engaging said ratchet wheel and pivotally mounted on the pivoted arm of said lever, and stop means cooperating with said lever and arranged whereby said pawl and said pivoted lever arm have a toggle action reacting through the pivotal axes of said lever for holding said pawl in the teeth of said ratchet wheel.

4. The combination with a dump vehicle, comprising two dump doors, of mechanism for moving said doors to closed position, and release mechanism for permitting said doors to dump, said release mechanism comprising cooperating tripping members for releasing one of said doors independently of the other door, but preventing release of the latter door independently of the first mentioned door.

5. The combination with a dump vehicle, comprising two dump doors, of mechanism for moving said doors to closed position, comprising two ratchet wheels, means operatively connecting each of said ratchet wheels individually with one of said doors, actuating means for operating said ratchet wheels to close said doors, detent pawls for holding said ratchet wheels against retrograde movement, and cooperating tripping members for releasing one of said pawls independently of the other but preventing release of the latter pawl independently of the first mentioned pawl.

6. A dump wagon, comprising a bed, a front pair of dump doors disposed in the bottom of said bed, a rear pair of dump doors disposed in the bottom of said bed, flexible hoisting members operatively connected with both pairs of doors, winding members on which said flexible hoisting members are wound, a first ratchet wheel connected with one of said winding members and operative to raise the front pair of doors, a second ratchet wheel connected with another of said winding members and operative to raise the rear pair of doors, means for advancing said ratchet wheels to raise said doors, a pair of tripping levers, detent pawls carried by said levers and engaging with said ratchet wheels, one of said tripping levers being operable independently of the other for releasing said second ratchet wheel to permit the rear pair of doors to dump, and means for preventing operation of the other of said tripping levers independently of said first mentioned lever whereby the dumping of said front pair of doors also requires dumping of the rear pair of doors.

7. The combination with a dump vehicle comprising two dump doors, of mechanism for closing said doors comprising a single operating handle, and means at one end of said handle comprising a selector member cooperating with a pair of advancing pawls at the other end of said lever whereby actuation of said handle is effective to close either of said doors independently of the other.

8. The combination with a dump vehicle comprising two dump doors, of mechanism for closing said doors comprising a single operating handle, and means comprising a selector member at one end of said handle, cooperating with a pair of advancing pawls at the other end of said lever whereby actuation of said handle is effective to close said doors, either selectively or simultaneously.

9. The combination with a dump vehicle comprising two dump doors, of mechanism for closing said doors comprising winding devices for each door, a single manually operated lever, and means cooperating with said lever comprising two normally nonoperative pawls and a common selector member for rendering either or both of said pawls effective whereby said lever is operative to actuate said winding devices selectively or simultaneously.

10. The combination with a dump wagon comprising two dump doors, of mechanism for closing said doors comprising individual winding drums operatively connected with said doors, two ratchet wheels individual to said winding drums, a single manually operated lever, and two advancing pawls associated with said lever, means normally holding said pawls out of engagement with said ratchet wheels, and a pawl selector member on said lever whereby said lever is operative to transmit winding rotation selectively to either of said ratchet wheels, or simultaneously to both of said wheels.

11. The combination with a dump vehicle comprising two dump doors, of mechanism for closing said doors comprising a single operating handle, means cooperating with said handle comprising two pawls and a selector member common thereto for rendering either of said pawls operative whereby actuation of said handle is effective to close either of said doors independently of the other, and release mechanism comprising tripping members for releasing one of said doors independently of the other.

12. The combination with a dump vehicle comprising two dump doors, of mechanism for closing said doors comprising winding devices for each door, a single manually operated lever, means cooperating therewith whereby said lever is operative to actuate said winding devices selectively or simultaneously, and release mechanism for permitting said doors to dump, said release mechanism comprising cooperating tripping members for releasing one of said doors independently of the other door, but preventing release of the latter door independently of the first mentioned door.

13. The combination with a dump wagon comprising two dump doors, of mechanism for moving said doors to closed position comprising two ratchet wheels, means operatively connecting each of said ratchet wheels individually with one of said doors, a single manually operated lever, means associated therewith whereby said lever is operative to transmit winding rotation selectively to either of said ratchet wheels, or simultaneously to both of said wheels, detent pawls for holding said ratchet wheels against retrograde movement, and cooperating tripping members for releasing one of said pawls independently of the other, but preventing release of the latter pawl independently of the first mentioned pawl.

14. The combination with a dump wagon comprising dump doors, of mechanism for raising said doors to closed position comprising flexible hoisting members operatively connected with said doors, separate winding drums on which the hoisting members of said doors are wound, individual advancing pawls for each of said ratchet wheels, an operating lever for imparting advancing movement to said pawls, two control rods extending longitudinally of said operating lever, said control rods being operatively connected with said advancing pawls whereby movement of said control rods is operative selectively to render said advancing pawls effective or non-effective for transmitting advancing movement to their respective ratchet wheels, and a grip actuated member carried by said operating lever for thus moving said control rods for selectively placing said advancing pawls in operative condition.

15. The combination with a dump wagon comprising dump doors, of mechanism for closing said doors comprising two winding drums, ratchet wheels operatively connected with each of said winding drums, means for rotating said ratchet wheels to raise said doors, and releasable detent mechanism for holding said ratchet wheels against retrograde movement, said detent mechanism comprising two levers pivotally mounted on a substantially stationary axis, two detent pawls engaging said ratchet wheels and each pivotally mounted on a swinging arm of the associated lever, stop means cooperating with each lever and detent pawl and arranged whereby said pawl and said lever arm have a toggle action for holding said pawl in the teeth of its associated ratchet wheel, and means operatively connecting said pawls whereby one of said pawls can be released independently of the other, but release of the latter pawl also necessitates release of the first-mentioned pawl.

16. The combination with a dump wagon comprising dump doors, of mechanism for raising said doors to closed position comprising flexible hoisting members operatively connected with said doors, separate winding drums on which the hoisting members of said doors are wound, ratchet wheels operatively connected with each of said winding drums, a swinging support rotating concentrically of the axis of said ratchet wheels, individual advancing pawls for each of said ratchet wheels mounted on said swinging support, an operating lever extending from said swinging support, two control rods extending longitudinally of said operating lever, said control rods being operatively connected with said advancing pawls whereby movement of said rods relatively to said operating lever is effective to move one of said advancing pawls into or out of operative engagement with its individual ratchet wheel, and means comprising a selecting member mounted on said operating lever for actuating said control rods.

17. The combination with a dump vehicle comprising front and rear pairs of dump doors, of mechanism for raising said doors comprising first and second winding shafts, three winding drums mounted on said first shaft, a main hoisting chain connected with one of said drums and extending rearwardly along one side of the vehicle, an evener connected with the rear end of said main chain, two branch chains connected with said evener and extending forwardly below said front pair of doors, the front ends of said branch chains winding upon the other two drums on said first winding shaft, a winding drum on said second winding shaft, a main hoisting chain connected with said latter winding drum and extending rearwardly along the other side of the vehicle, an evener connected to the rear end of said latter hoisting chain, two branch chains connected with said latter evener, eveners connected with the other ends of both of said latter branch chains, a pair of secondary branch chains extending between said last-named eveners and passing beneath the rear pair of dump doors for raising the same, and operating mechanism for actuating said first and second winding shafts.

18. A dump vehicle comprising a bed, a transverse dividing member in said bed, a pair of laterally swinging dump doors closing the bottom of the bed adjacent to the front end thereof, a pair of laterally swinging dump doors closing the bottom of said bed adjacent to the rear end thereof, winding drum mechanism mounted at the front end of the vehicle and disposed crosswise thereof on transversely extending shaft supporting means, two flexible hoisting members extending substantially from end to end of the front doors below the same and having their opposite ends operatively connected with said winding mechanism, and two flexible hoisting members extending substantially from end to end of the rear doors below the same and having the opposite ends of both hoisting members operatively connected with said winding mechanism, equalizing members arranged in line with the ends of each hoisting member and said winding mechanism, whereby actuation of said winding mechanism applies uniform lifting effort directly to both ends of either pair of doors through the associated hoisting members.

In witness whereof, we hereunto subscribe our names this 19th day of December, 1928.

JAMES D. BENBOW.
JAMES B. GREEN.